US008734238B2

(12) United States Patent
Arnone et al.

(10) Patent No.: US 8,734,238 B2
(45) Date of Patent: May 27, 2014

(54) ANTI-CHEATING HYBRID GAME

(71) Applicant: Gamblit Gaming, LLC, Glendale, CA (US)

(72) Inventors: Miles Arnone, Sherborn, MA (US); Frank Cire, Pasadena, CA (US); Caitlyn Ross, Watertown, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 13/928,166

(22) Filed: Jun. 26, 2013

(65) Prior Publication Data

US 2013/0288785 A1 Oct. 31, 2013

Related U.S. Application Data

(63) Continuation of application No. PCT/US2012/064716, filed on Nov. 12, 2012.

(60) Provisional application No. 61/629,019, filed on Nov. 10, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .................. 463/25; 463/16; 463/20; 463/40; 463/41; 463/42

(58) Field of Classification Search
USPC ............................. 463/16, 20, 25, 40, 41, 42
See application file for complete search history.

(56) References Cited

U.S. PATENT DOCUMENTS

| | | |
|---|---|---|
| 5,413,357 A | 5/1995 | Schulze et al. |
| 5,718,429 A | 2/1998 | Keller |

(Continued)

FOREIGN PATENT DOCUMENTS

| | | |
|---|---|---|
| JP | 2001300098 A | 10/2001 |
| JP | 2003111980 A | 4/2003 |

(Continued)

OTHER PUBLICATIONS

ITL.NIST.GOV, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — Adetokunbo O Torimiro
(74) *Attorney, Agent, or Firm* — Frank Cire

(57) ABSTRACT

Systems and methods in accordance with embodiments operate an anti-cheating hybrid game. One embodiment includes an anti-cheating hybrid game constructed to communicate occurrences based upon a player's skillful execution of an entertainment game that triggers a randomly generated payout to a gambling game; where the anti-cheating hybrid game incorporates an anti-cheating module constructed to: receive player data for a player, where the player data is indicative of the player's current gameplay performance at the entertainment game; analyze the player data to determine whether cheating is occurring by comparing the player's current gameplay performance with historical gameplay data to evaluate whether the player's current gameplay performance is beyond the statistical limits of the randomness inherent in the anti-cheating hybrid game; and send a command to penalize the player during play of the entertainment game based upon a determination that cheating has occurred from the analyzed player data.

19 Claims, 6 Drawing Sheets

(56) References Cited

U.S. PATENT DOCUMENTS

| | | | |
|---|---|---|---|
| 5,785,592 | A | 7/1998 | Jacobsen |
| 6,050,895 | A | 4/2000 | Luciano |
| 6,227,974 | B1 | 5/2001 | Eilat |
| 6,267,669 | B1 | 7/2001 | Luciano |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung et al. |
| 7,753,770 | B2 | 7/2010 | Walker et al. |
| 7,753,790 | B2 | 7/2010 | Nguyen |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0234791 | A1 | 10/2006 | Nguyen et al. |
| 2006/0258433 | A1 | 11/2006 | Finocchio et al. |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0117641 | A1 | 5/2007 | Walker et al. |
| 2007/0129149 | A1 | 6/2007 | Walker |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0191104 | A1 | 8/2007 | Van Luchene |
| 2007/0203828 | A1 | 8/2007 | Jung et al. |
| 2007/0293306 | A1 | 12/2007 | Nee et al. |
| 2008/0004107 | A1* | 1/2008 | Nguyen et al. .................. 463/29 |
| 2008/0014835 | A1 | 1/2008 | Weston et al. |
| 2008/0015004 | A1 | 1/2008 | Gatto et al. |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108425 | A1 | 5/2008 | Oberberger |
| 2008/0119283 | A1 | 5/2008 | Baerlocher |
| 2008/0146308 | A1 | 6/2008 | Okada |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0082093 | A1 | 3/2009 | Okada |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0176560 | A1 | 7/2009 | Herrmann et al. |
| 2009/0176566 | A1 | 7/2009 | Kelly |
| 2009/0221355 | A1 | 9/2009 | Dunaevsky et al. |
| 2009/0247272 | A1 | 10/2009 | Abe |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis et al. |
| 2010/0004058 | A1 | 1/2010 | Acres |
| 2010/0016056 | A1 | 1/2010 | Thomas et al. |
| 2010/0035674 | A1 | 2/2010 | Slomiany |
| 2010/0056247 | A1 | 3/2010 | Nicely |
| 2010/0062836 | A1 | 3/2010 | Young |
| 2010/0093420 | A1 | 4/2010 | Wright |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gergon |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0109454 | A1 | 5/2011 | McSheffrey |
| 2011/0111837 | A1 | 5/2011 | Gagner |

| | | | |
|---|---|---|---|
| 2011/0118011 | A1 | 5/2011 | Filipour et al. |
| 2011/0201413 | A1 | 8/2011 | Oberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0202587 | A1 | 8/2012 | Allen |
| 2012/0322545 | A1 | 12/2012 | Arnone et al. |

FOREIGN PATENT DOCUMENTS

| | | | |
|---|---|---|---|
| JP | 2004097610 | A | 4/2004 |
| JP | 2004166746 | A | 6/2004 |
| WO | 9851384 | A1 | 11/1998 |
| WO | 2010087090 | A1 | 8/2010 |
| WO | WO 2011109454 | A1 * | 9/2011 |
| WO | 2012139083 | A1 | 10/2012 |
| WO | 20130059038 | A1 | 4/2013 |

OTHER PUBLICATIONS

Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
International Search Report and Written Opinion, PCT/US2012/64716, Mar. 8, 2013.
WIPO/IPEA International Preliminary Report on Patentability, PCT/US12/64716, Aug. 19, 2013.

* cited by examiner

| N | 10% | 7.5% | 5% | 2.5% | 1% |
|---|---|---|---|---|---|
| 3 | 1.15 | 1.15 | 1.15 | 1.15 | 1.15 |
| 4 | 1.42 | 1.44 | 1.46 | 1.48 | 1.49 |
| 5 | 1.60 | 1.64 | 1.67 | 1.71 | 1.75 |
| 6 | 1.73 | 1.77 | 1.82 | 1.89 | 1.94 |
| 7 | 1.83 | 1.88 | 1.94 | 2.02 | 2.10 |
| 8 | 1.91 | 1.96 | 2.03 | 2.13 | 2.22 |
| 9 | 1.98 | 2.04 | 2.11 | 2.21 | 2.32 |
| 10 | 2.03 | 2.10 | 2.18 | 2.29 | 2.41 |
| 11 | 2.09 | 2.14 | 2.23 | 2.36 | 2.48 |
| 12 | 2.13 | 2.20 | 2.29 | 2.41 | 2.55 |
| 13 | 2.17 | 2.24 | 2.33 | 2.46 | 2.61 |
| 14 | 2.21 | 2.28 | 2.37 | 2.51 | 2.66 |
| 15 | 2.25 | 2.32 | 2.41 | 2.55 | 2.71 |
| 16 | 2.28 | 2.35 | 2.44 | 2.59 | 2.75 |
| 17 | 2.31 | 2.38 | 2.47 | 2.62 | 2.79 |
| 18 | 2.34 | 2.41 | 2.50 | 2.65 | 2.82 |
| 19 | 2.36 | 2.44 | 2.53 | 2.68 | 2.85 |
| 20 | 2.38 | 2.46 | 2.56 | 2.71 | 2.88 |
| 21 | | | 2.58 | 2.73 | 2.91 |
| 22 | | | 2.60 | 2.76 | 2.94 |
| 23 | | | 2.62 | 2.78 | 2.96 |
| 24 | | | 2.64 | 2.80 | 2.99 |
| 25 | | | 2.66 | 2.82 | 3.01 |
| 26 | | | 2.680 | 2.840 | |
| 27 | | | 2.700 | 2.860 | |
| 28 | | | 2.720 | 2.880 | |
| 29 | | | 2.730 | 2.900 | |
| 30 | | | 2.750 | 2.910 | |
| 31 | | | 2.760 | 2.930 | |
| 32 | | | 2.780 | 2.950 | |
| 33 | | | 2.790 | 2.960 | |
| 34 | | | 2.810 | 2.970 | |
| 35 | | | 2.830 | 2.980 | |
| 36 | | | 2.830 | 2.992 | |
| 37 | | | 2.840 | 3.004 | |
| 38 | | | 2.850 | 3.016 | |
| 39 | | | 2.860 | 3.028 | |
| 40 | | | 2.870 | 3.040 | |
| 41 | | | 2.880 | 3.050 | |
| 42 | | | 2.890 | 3.060 | |
| 43 | | | 2.900 | 3.070 | |
| 44 | | | 2.910 | 3.080 | |
| 45 | | | 2.920 | 3.090 | |
| 46 | | | 2.928 | 3.098 | |
| 47 | | | 2.936 | 3.106 | |
| 48 | | | 2.944 | 3.114 | |
| 49 | | | 2.952 | 3.122 | |
| 51 | | | 2.967 | 3.137 | |
| 52 | | | 2.974 | 3.144 | |
| 53 | | | 2.981 | 3.151 | |
| 54 | | | 2.988 | 3.158 | |
| 55 | | | 2.995 | 3.165 | |
| 56 | | | 3.002 | 3.172 | |
| 57 | | | 3.009 | 3.179 | |
| 58 | | | 3.016 | 3.186 | |
| 59 | | | 3.023 | 3.193 | |
| 60 | | | 3.030 | 3.200 | |
| 61 | | | 3.036 | 3.206 | |
| 62 | | | 3.042 | 3.212 | |
| 63 | | | 3.048 | 3.218 | |
| 64 | | | 3.054 | 3.224 | |
| 65 | | | 3.060 | 3.230 | |
| 66 | | | 3.066 | 3.236 | |
| 67 | | | 3.072 | 3.242 | |
| 68 | | | 3.078 | 3.248 | |
| 69 | | | 3.084 | 3.254 | |
| 70 | | | 3.090 | 3.260 | |
| 71 | | | 3.095 | 3.265 | |
| 72 | | | 3.100 | 3.270 | |
| 73 | | | 3.105 | 3.275 | |
| 74 | | | 3.110 | 3.280 | |
| 75 | | | 3.115 | 3.285 | |
| 76 | | | 3.120 | 3.290 | |
| 77 | | | 3.125 | 3.295 | |
| 78 | | | 3.130 | 3.300 | |
| 79 | | | 3.135 | 3.305 | |
| 80 | | | 3.140 | 3.310 | |
| 81 | | | 3.144 | 3.314 | |
| 82 | | | 3.148 | 3.318 | |
| 83 | | | 3.152 | 3.322 | |
| 84 | | | 3.156 | 3.326 | |
| 85 | | | 3.160 | 3.330 | |
| 86 | | | 3.164 | 3.334 | |
| 87 | | | 3.168 | 3.338 | |
| 88 | | | 3.172 | 3.342 | |
| 89 | | | 3.176 | 3.346 | |
| 90 | | | 3.180 | 3.350 | |
| 91 | | | 3.183 | 3.353 | |
| 92 | | | 3.186 | 3.356 | |
| 93 | | | 3.189 | 3.359 | |
| 94 | | | 3.192 | 3.362 | |
| 95 | | | 3.195 | 3.365 | |
| 96 | | | 3.198 | 3.368 | |
| 97 | | | 3.201 | 3.371 | |
| 98 | | | 3.204 | 3.374 | |
| 99 | | | 3.207 | 3.377 | |
| 100 | | | 3.210 | 3.380 | |

*FIG. 4*

ANTI-CHEATING HYBRID GAME

CROSS REFERENCE TO RELATED APPLICATIONS

This application is a continuation of Patent Cooperation Treaty Application No. PCT/US12/64716, filed on Nov. 12, 2012, which claims the priority of U.S. Provisional Patent Application No. 61/629,019 filed Nov. 10, 2011 and is related to PCT patent application PCT/US11/26768, filed Mar. 1, 2011, entitled "ENRICHED GAME PLAY ENVIRONMENT (SINGLE and/or MULTI-PLAYER) FOR CASINO APPLICATIONS", U.S. Provisional Patent Application 61/459,131, filed Dec. 6, 2010, and U.S. Provisional Patent Application 61/460,362, filed Dec. 31, 2010, U.S. Provisional Patent Application 61/516,693, filed Apr. 6, 2011, U.S. Provisional Patent Application entitled "ENRICHED TABLE TOP GAME PLAY ENVIRONMENT (SINGLE OR MULTI-PLAYER) FOR CASINO APPLICATIONS", filed Sep. 30, 2011, U.S. Provisional Patent Application entitled "ANTI-SANDBAGGING IN ENRICHED GAME PLAY ENVIRONMENT (SINGLE AND/OR MULTI-PLAYER) FOR CASINO APPLICATIONS", filed Oct. 17, 2011, U.S. Provisional Patent Application entitled "SKILL-LEVELING IN ENRICHED GAME PLAY ENVIRONMENT (SINGLE AND/OR MULTI-PLAYER) FOR CASINO APPLICATIONS", filed Oct. 17, 2011, and U.S. Provisional Patent Application entitled "HEAD-TO-HEAD AND TOURNAMENT PLAY FOR ENRICHED GAME PLAY ENVIRONMENT (SINGLE AND/OR MULTI-PLAYER) FOR CASINO APPLICATIONS", filed Oct. 17, 2011 the contents of each of which are hereby incorporated by reference in its entirety as if stated in full herein.

FIELD OF THE INVENTION

Embodiments of the present invention are generally related to gaming and more specifically to an anti-cheating hybrid game that includes both a gambling game and an entertainment game with measures taken to prevent or penalize cheating.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments operate an anti-cheating hybrid game. One embodiment includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine incorporates an anti-cheating module and the anti-cheating module is constructed to: receive player data for at least one player, where the player data is indicative of a player's current gameplay performance at the entertainment game; analyze the player data to determine whether cheating is occurring by comparing the at least one player's current gameplay performance with historical gameplay data to evaluate whether the at least one player's current gameplay performance is beyond the statistical limits of the randomness inherent in the entertainment game; and send a command to penalize at least one player during play of the entertainment game based upon a determination that cheating has occurred from the analyzed player data.

In a further embodiment, the historical gameplay data is gameplay data concerning at least one player's historical performance at the entertainment game over several gameplay sessions.

In another embodiment, the historical gameplay data is gameplay data concerning historical performance of players at the entertainment game over several gameplay sessions.

In a still further embodiment, the player data is analyzed using an outlier test.

In still another embodiment, the player data further includes an amount of real world credit committed by at least one player to the gambling game.

In a yet further embodiment, the player data further includes a rate of real world credit commitment by at least one player to the gambling game.

In yet another embodiment, the command to penalize at least one player is a command to suspend a player account of a player determined to be cheating.

In a further embodiment again, at least one counter is utilized by the game world engine and the anti-cheating module is constructed to increment the counter upon each instance of cheating.

In another embodiment again, the command to penalize at least one player is determined based upon a value of at least one counter.

In a further additional embodiment, the anti-cheating module is constructed to communicate with the game world engine via a network.

Another additional embodiment includes a method of operating an anti-cheating hybrid game that includes an entertainment game constructed to provide outcomes upon a player's skillful execution of the entertainment game, the method including: receiving player data indicative of at least one player's current gameplay performance at the anti-cheating hybrid game using an anti-cheating module incorporated with a game world engine, where the game world engine is constructed to communicate gameplay gambling event occurrences based upon a player's skillful execution of the entertainment game to earn game world credits as detected by an entertainment software engine that triggers a randomly generated payout of real world credits for a gambling game to the gambling game including a real world engine constructed to provide a randomly generated payout for the gambling game; analyzing the player data using the anti-cheating module incorporated with the game world engine to determine whether cheating is occurring by comparing the at least one player's current gameplay performance with historical gameplay data to evaluate whether at least one player's current gameplay performance is beyond the statistical limits of the randomness inherent in the entertainment game; and sending a command to penalize at least one player during play of the entertainment game based upon a determination that cheating has occurred from the analyzed player data using the anti-cheating module incorporated with the game world engine.

In a still yet further embodiment, the historical gameplay data is gameplay data concerning at least one player's historical performance at the entertainment game over several gameplay sessions.

In still yet another embodiment, the historical gameplay data is gameplay data concerning historical performance of players at the entertainment game over several gameplay sessions.

In a still further embodiment again, the player data is analyzed using an outlier test.

In still another embodiment again, the player data further includes real world credit committed by at least one player to the gambling game.

In a still further additional embodiment, the command to penalize at least one player is a command to suspend a player account of a player determined to be cheating.

In still another additional embodiment, at least one counter is utilized by the game world engine and the anti-cheating module is constructed to increment the counter upon each instance of cheating.

In a yet further embodiment again, the command to penalize at least one player is determined based upon a value of at least one counter.

In yet another embodiment again, the anti-cheating module is constructed to communicate with the game world engine via a network.

A yet further additional embodiment includes a machine readable medium containing processor instructions, where execution of the instructions by a processor causes the processor to perform a process including: receiving player data indicative of at least one player's current gameplay performance at an anti-cheating hybrid game using an anti-cheating module incorporated with a game world engine, where the game world engine is constructed to communicate gameplay gambling event occurrences based upon a player's skillful execution of the entertainment game to earn game world credits as detected by an entertainment software engine that triggers a randomly generated payout of real world credits for a gambling game to the gambling game including a real world engine constructed to provide a randomly generated payout for the gambling game; analyzing the player data using the anti-cheating module incorporated with the game world engine to determine whether cheating is occurring by comparing the at least one player's current gameplay performance with historical gameplay data to evaluate whether at least one player's current gameplay performance is beyond the statistical limits of the randomness inherent in the entertainment game; and sending a command to penalize at least one player during play of the entertainment game based upon a determination that cheating has occurred from the analyzed player data using the anti-cheating module incorporated with the game world engine.

A yet another additional embodiment includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to: receive information concerning the spatial location of user interfaces; and assign players to user interfaces that are not adjacent based upon the number of players and the spatial location of user interfaces.

A further additional embodiment again includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to: receive information concerning the Internet Protocol addresses of player devices in network communication with the anti-cheating hybrid game that a player can use to interact with an entertainment game; and assign player devices with the same Internet Protocol addresses to interact with different entertainment games.

Another additional embodiment again includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to: generate a user interface for each player with information concerning entertainment game execution; and encrypt the user interface for each player such that each user interface is only accurately viewable to the player to which the user interface is assigned.

Another further embodiment includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to: generate a user interface for each player with information concerning entertainment game execution; and encrypt user interfaces for each player by scrambling the position information of elements used in the entertainment game such that each user interface is only accurately viewable to the player to which the user interface is assigned.

A still another further embodiment includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to: store player identifying information; and generate user interfaces for each player that filter out the player identifying information other than that of the player to which the user interface is assigned from being displayed on the user interfaces.

A yet another further embodiment includes an anti-cheating hybrid game, including: a gambling game including a real world engine constructed to provide a randomly generated payout of real world credits for the gambling game; an entertainment software engine constructed to execute an entertainment game providing outcomes upon a player's skillful execution of the entertainment game to earn game world credits, and manage a user interface of the entertainment game; a game world engine constructed to manage the entertainment software engine and communicate gameplay gambling event occurrences based upon a player's skillful execution of the entertainment game that trigger the randomly generated payout for the gambling game to the gambling game; and where the game world engine is constructed to send information concerning entertainment game execution to a non-player interface for view by third parties that are not players of the anti-cheating hybrid game, where the information displayed by the non-player interface passes through a filter that filters out player identifying information from being displayed in the non-player interface.

BRIEF DESCRIPTION OF THE DRAWINGS

FIG. 4 is a lookup table that can be used to determine that a player's performance circumvents the natural randomness within an entertainment game as to be indicative of cheating in accordance with an embodiment of the invention.

DETAILED DESCRIPTION

Figure 1:
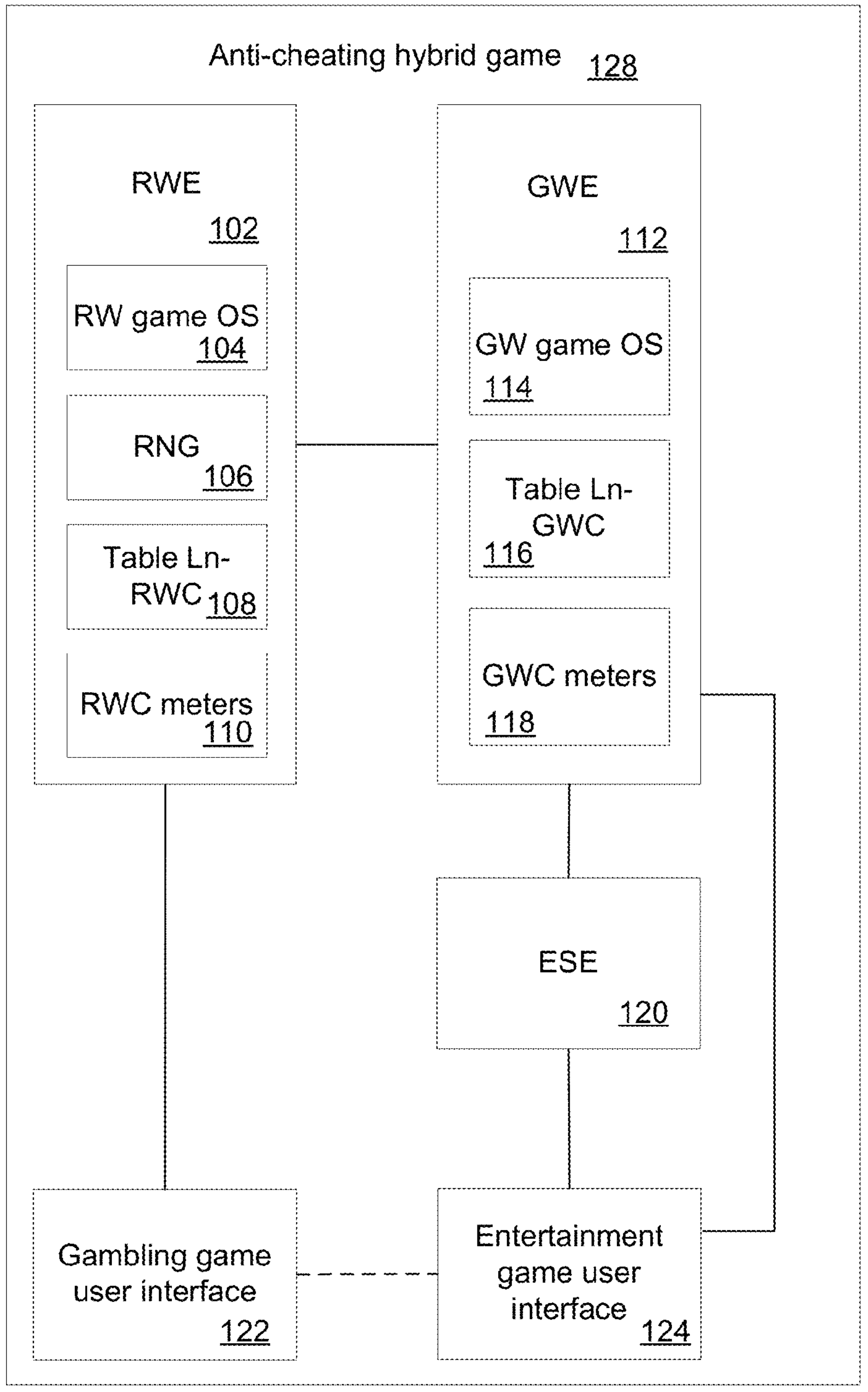
FIG. 1 illustrates an anti-cheating hybrid game in accordance with an embodiment of the invention.

Turning now to the drawings, systems and methods for operation of an anti-cheating hybrid game are illustrated. In several embodiments, an anti-cheating hybrid game is a form of a hybrid game that integrates both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the anti-cheating hybrid game also includes a user interface associated with either or both the gambling game and the entertainment game. In operation of an anti-cheating hybrid game, a player acts upon various types of elements of the entertainment game in a game world environment. Upon acting on some of these elements, a wager is triggered in the gambling game. In playing the entertainment game, using the elements, a player can consume and accrue game world credits (GWC) within the entertainment game. These credits can be in the form of (but are not limited to) game world objects, experience points, or points generally. Wagers are made in the gambling game using real world credits (RWC). The real world credits can be credits in an actual currency, or may be credits in a virtual currency which has real world value. Gambling outcomes from the gambling game may cause consumption, loss or accrual of RWC. In addition, gambling outcomes in the gambling game may influence elements in the entertainment game such as (but not limited to) by restoring a consumed element, causing the loss of an element, restoration or placement of a fixed element. Example elements include enabling elements (EE) which are elements that enable a player's play of the entertainment game and whose consumption by the player while playing the entertainment game may trigger a wager in a gambling game. In addition, EE may also be replenished during play within the entertainment game based on an outcome of a triggered wager. Other types of elements include actionable elements (AE) which are elements that are acted upon to trigger a wager in the gambling game and may not be restorable during normal play of the entertainment game. Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, an anti-cheating hybrid game utilizes various methods to take preventive measures against cheating from occurring or to take action to penalize cheating within a hybrid game. Cheating includes the unauthorized usage of an entertainment game which can unfairly impact the pleasure or progress of entertainment game play or the GWC earned through play of the entertainment game. An anti-cheating hybrid game can utilize anti-cheating modules performed by a local GWE or remotely via a server which performs services for an anti-cheating hybrid game. In certain embodiments, an anti-cheating hybrid game can include physical measures against cheating, such as (but not limited to) utilizing blinders to separate players from each other.

In many embodiments, an anti-cheating hybrid game utilizes one or more methods to take measures to prevent cheating from occurring or penalize cheating within a hybrid game. In various embodiments, preventative measures against cheating can be accomplished in many ways, including (but not limited to) obscuring a player's access to information concerning gameplay progress of the other players of a multiplayer game or preventing third parties from communicating information concerning gameplay to players, delaying view of gameplay for players that are not active in the current round of play, disabling players at the same IP address or geographic location from playing in the same game, physically obscuring the view of a player's entertainment game user interfaces from other players, encrypting a player's entertainment game user interface such that it cannot be easily viewed by other players, separating players from playing in close proximity to each other or by making gameplay anonymous where players do not know who they are playing against.

In various embodiments, an anti-cheating hybrid game can penalize detected cheating. Cheating can be detected when information about a player's performance appears to circumvent the natural randomness within an entertainment game or by an overt unauthorized action, such as (but not limited to) playing with more balls than authorized in a foosball entertainment game or using an unauthorized gun in a shooting entertainment game. The types of player performance information that may be collected while a player plays an anti-cheating hybrid game and used to detect cheating include, but are not limited to: an amount or rate of real world credit committed by a player in a gambling game of the anti-cheating hybrid game while playing an entertainment game of the anti-cheating hybrid game; an amount or rate of utilization or restoration of an enabling element or actionable element; an amount or rate of accrual or loss of real world credits or game world credits; an amount or rate of accrual or loss of game world objects; advancement or rate of advancement of the player through the entertainment game; an amount or rate of utilization of a game resource; an amount or rate of accrual or loss of a game resource; an amount or rate of accrual or loss of a game performance indicator including but not limited to skill points, bosses defeated, or non-player characters defeated and levels achieved. Cheating detected due to circumventing the natural randomness within an entertainment game can be detected from a statistical evaluation of a player's current performance against the player's expected performance to see if the player has significantly deviated from the expected performance. A player's expected performance can be determined from the player's historical performance or the historical performance of players of a particular entertainment game, or of entertainment games generally. In certain embodiments, a statistical evaluation can be an outlier test, such as the Grubb outlier test or a Dixon Q-test. In particular embodiments, different actions can be taken dependent upon the level or type of cheating detected. For example, a warning may be given to a player when cheating is first detected while a player's account is suspended when multiple instances of cheating are detected. Similarly, a warning may be given for cheating that does not seriously impact entertainment game play while a player's account is suspended or a player is fined for cheating that seriously impacts entertainment game play. Anti-cheating hybrid games in accordance with embodiments of the invention are discussed further below.

Anti-cheating Hybrid Games

In many embodiments, an anti-cheating hybrid game integrates high levels of entertainment content with a game of skill (entertainment game), a gambling experience with a game of chance (gambling game), with measures taken to prevent and/or penalize cheating. An anti-cheating hybrid game provides for random outcomes independent of player skill while providing that the user's gaming experience (as measured by obstacles/challenges encountered, time of play and other factors) is shaped by the player's skill. An anti-cheating hybrid game in accordance with an embodiment of the invention is illustrated in FIG. 1. The anti-cheating hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the fundamental operating system for the gambling game of the anti-cheating hybrid game 128 and controls and operates the gambling game. The operation of a gambling game is enabled by money, such as real funds, accretes and declinates real gambling credits based on random gambling outcome, and whose gambling proposition is typically regulated by gaming control bodies. In many embodiments, the RWE includes a RW operating system (OS) 104, random number generator (RNG) 106, level "n" real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level "n" real-world credit pay table (Table Ln-RWC) 108 is a table that can be used in conjunction with a random number generator (RNG) 106 to dictate the real world credits (RWC) earned as a function of gameplay and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game "level n" need not be the same for each level.

In many embodiments, the GWE 112 manages the overall anti-cheating hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120. The GWE can also implement various anti-cheating modules designed to prevent or penalize cheating detected in an entertainment game.

In many embodiments, a level "n" game world credit pay table (Table Ln-GWC) 116 dictates the GWC earned as a function of player skill in the nth level of the game. The payouts governed by this table are dependent upon player skill and gameplay at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each entertainment game has one or more scoring criterion, embedded within the Table Ln-GWC 116 that reflects player performance against the goal(s) of the game. GWC can be carried forward from one level of gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1, the GWE 112 is also shown as connecting to the players user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implement using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of an anti-cheating hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independent from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's algorithm may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance running every 10 seconds where the amount wagered is communicated from the GWE 112 as a function of choices the player makes in the operation profile in the entertainment game such as those cited above.

In many embodiments, an anti-cheating hybrid game integrates a video game style gambling machine, where the gambling game (i.e. RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance, such as a slot machine, is preserved. At the same time a rich environment of rewards to stimulate "gamers" can be established with the entertainment game. In several embodiments, the anti-cheating hybrid game can leverage very popular titles with "gamers" and provides a sea change environment for casinos to attract players with games that are more akin to the type of entertainment which a younger generation desires. In various embodiments, players can use their skill towards building and banking GWC which in turn can be used to win tournaments and various prizes as a function of their "gamer" prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, anti-cheating hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The anti-cheating hybrid game can include an entertainment game that includes head-to-head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to solitaire and babette).

In many embodiments, if an entertainment game includes a version of Madden Football™ a player can bet on whether or not the player is going to beat the computer, or if the player is playing against another player, that other player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head-to-head competition in the context of their skill level in the entertainment game in question. As such, players can have a handicap associated with their player profile that describes their skill (which can be their "professed skill" in certain embodiments), and which is used by a GWE (such as a local GWE or a GWE that receives services from remote servers) to offer appropriate bets around the final and/or intermediate outcomes of the entertainment game, and/or to condition gameplay as a function of player skill, and/or to select players across one or more anti-cheating hybrid games to participate in head to head games and/or tournaments.

Many embodiments enable the maximization of the number of players able to compete competitively by utilizing a skill normalization module. Handicapping enables players of varying performance potential to compete competitively regardless of absolute skill level, such as but not limited to where a player whose skill level identifies the player as a beginner can compete in head-to-head or tournament play against a highly skilled player with meaningful results.

In several embodiments, wagers can be made among numerous anti-cheating hybrid games with a global betting manager (GBM). The GBM is a system that coordinates wagers that are made across multiple anti-cheating hybrid games by multiple players. In some implementations it can also support wagers by third parties relative to the in game performance of other players. The GBM can stand alone, or is capable of being embedded in one of a number of systems, including a GWE, ESE or any remote server capable of providing services to an anti-cheating hybrid game, or can operate independently on one or a number of servers on-site at a casino, as part of a larger network and/or the internet or "cloud" in general. The GBM also supports the management of lottery tickets issued as a function of gameplay.

In many embodiments, third parties that are not playing a hybrid game may want to view and/or wager on entertainment game play. A GWE may relay information to a non-player interface for third parties to gather information concerning entertainment game play. In embodiments where the entertainment game is a fighting game, third parties may want to witness the movements of the game characters rather than simply the outcome of a fight. Therefore, the GWE can transmit information not only to the entertainment game user interface, but also to a non-player interface.

In various embodiments, a third party can see only select information about the gameplay and players on a non-player interface. This information can include (but is not limited to) patron information, EE values, GWC, RW wagers or any other information that can be transmitted to the GW user interface. For instance, the entertainment gameplay information may be visible to third parties on a non-player interface, but not information concerning the wagers a player is making in a gambling game of the anti-cheating hybrid game. Alternatively, in a shooter game, the third parties may be able to see how much health each player has remaining, but has no information about how much ammunition each player has.

In a number of embodiments, a non-player interface can include information that is not directly related to the entertainment game play of a particular anti-cheating hybrid game. This information can include, but is not limited to, the number of players betting on the entertainment game play, side-bets available, or leader-boards. Information available to a non-player interface may or may not be also visible in an entertainment game user interface.

Figure 2:
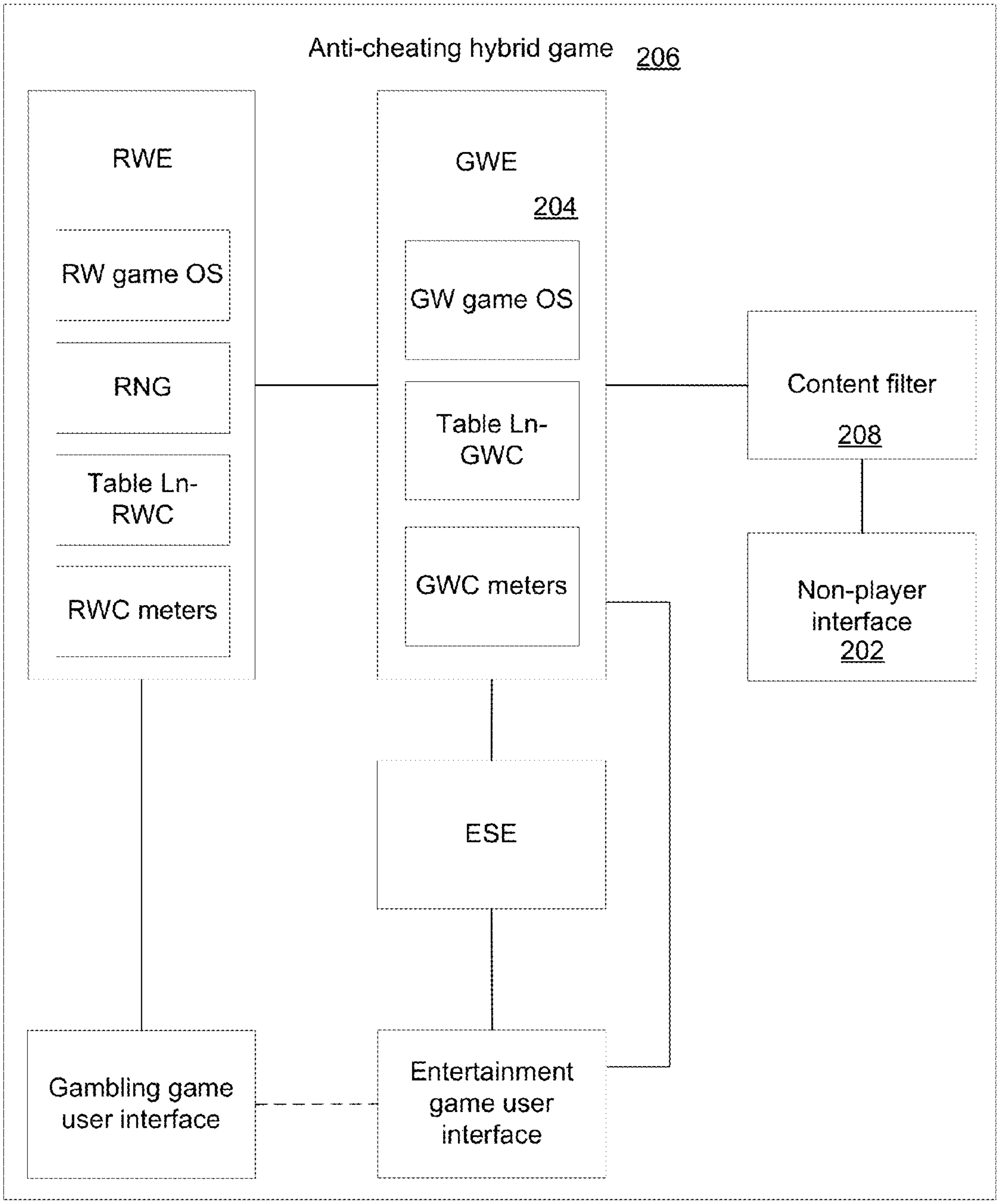
FIG. 2 illustrates an anti-cheating hybrid game with a non-player interface in accordance with an embodiment of the invention.

A hybrid game utilizing a non-player interface is illustrated in FIG. 2. The non-player interface 202 communicates with the GWE 204 of an anti-cheating hybrid game 206 to display information relating to entertainment game play through a content filter 208. The content filter can determine what information is accessible to the non-player interface 202, such as (but not limited to) whether the non-player interface 202 can see the gameplay progress of all or only some of the players.

Although various components of anti-cheating hybrid games are discussed above, anti-cheating hybrid games can be configured with any component appropriate to the requirements of a specific application in accordance with embodiments of the invention. Network connected anti-cheating hybrid games are discussed further below.

Network Connected Anti-Cheating Hybrid Games

Anti-cheating hybrid games in accordance with many embodiments of the invention can operate locally while being network connected to draw services from remote locations or to communicate with other anti-cheating hybrid games. In many embodiments, operations associated with an anti-cheating hybrid game such as (but not limited to) processes for calculating score or RWC and GWC tracking can be performed across multiple devices. These multiple devices can be implemented using a single server or a plurality of servers such that an anti-cheating hybrid game is executed as a system in a virtualized space, such as (but not limited to) where the RWE and GWE are large scale centralized servers "in the cloud" coupled to a plurality of widely distributed ESE controllers or clients via the Internet.

In many embodiments, an RWE server can perform certain functionalities of a RWE of an anti-cheating hybrid game. In certain embodiments, a RWE server includes a centralized odds engine which can generate random outcomes (such as but not limited to win/loss outcomes) for a gambling game, thereby eliminating the need to have that functionality of the RWE performed locally within the anti-cheating hybrid game. The RWE server can perform a number of simultaneous or pseudo-simultaneous runs in order to generate random outcomes for a variety of odds percentages that one or more networked anti-cheating hybrid games may require. In certain embodiments, an RWE of an anti-cheating hybrid game can send information to a RWE server including (but not limited to) Table Ln-RWC tables, maximum speed of play for a gambling game, gambling game monetary denominations or any promotional RWC provided by the operator of the anti-cheating hybrid game. In particular embodiments, a RWE server can send information to a RWE of an anti-cheating hybrid game including (but not limited to) RWC used in the gambling game, player account information or play activity and a profile associated with a player.

In several embodiments, a GWE server can perform the functionality of the GWE across various anti-cheating hybrid games. These functionalities can include (but are not limited to) providing a method for monitoring high scores on select groups of games, linking groups of games in order to join them in head-to-head tournaments, and acting as a tournament manager. A GWE server can also execute anti-cheating modules that prevent or penalize cheating at an entertainment game.

In a variety of embodiments, management of player account information can be performed by a GWE patron management server separate from a GWE server. A GWE patron management server can manage player account information, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of an anti-cheating hybrid game can send information to a GW patron management server including (but not limited to) GWC and RWC used in a game, player account information, play activity and profile information for players and synchronization information between a gambling game and an entertainment game or other aspects of an anti-cheating hybrid game. In particular embodiments, a GW patron management server can send information to a GWE of an anti-cheating hybrid game including (but not limited to) entertainment game title and type, tournament information, Table Ln-GWC tables, special offers, character or profile setup and synchronization information between a gambling game and an entertainment game or other aspects of an anti-cheating hybrid game.

In numerous embodiments, an ESE server provides a host for managing head-to-head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

Servers connected via a network to implement anti-cheating hybrid games in accordance with many embodiments of the invention can communicate with each other to provide services utilized within an anti-cheating hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the anti-cheating hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of an anti-cheating hybrid game tournament. Typically a GWE (such as a GWE that runs within an anti-cheating hybrid game or on a GWE server) is not aware of the relationship of itself to the rest of a tournament since in a typical configuration the actual tournament play is managed by the ESE server. Therefore, management of an anti-cheating hybrid game tournament can include (but is not limited to) tasks such as: conducting tournaments according to system programming that can be coordinated by an operator of the anti-cheating hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of an anti-cheating hybrid game, exchange of data necessary to link a player's profile to their ability to participate in various forms of gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular anti-cheating hybrid game, as recorded in their player account, determining a player's play and gambling performance for the purposes of marketing intelligence, and logging secondary drawing awards, tournament prizes, RWC and GWC into the player's account.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with an anti-cheating hybrid game locally. In certain embodiments, a server is a server system including a plurality of servers, where software may be run on one or more physical devices. Similarly, in particular embodiments, multiple servers may be combined on a single physical device.

Figure 3:
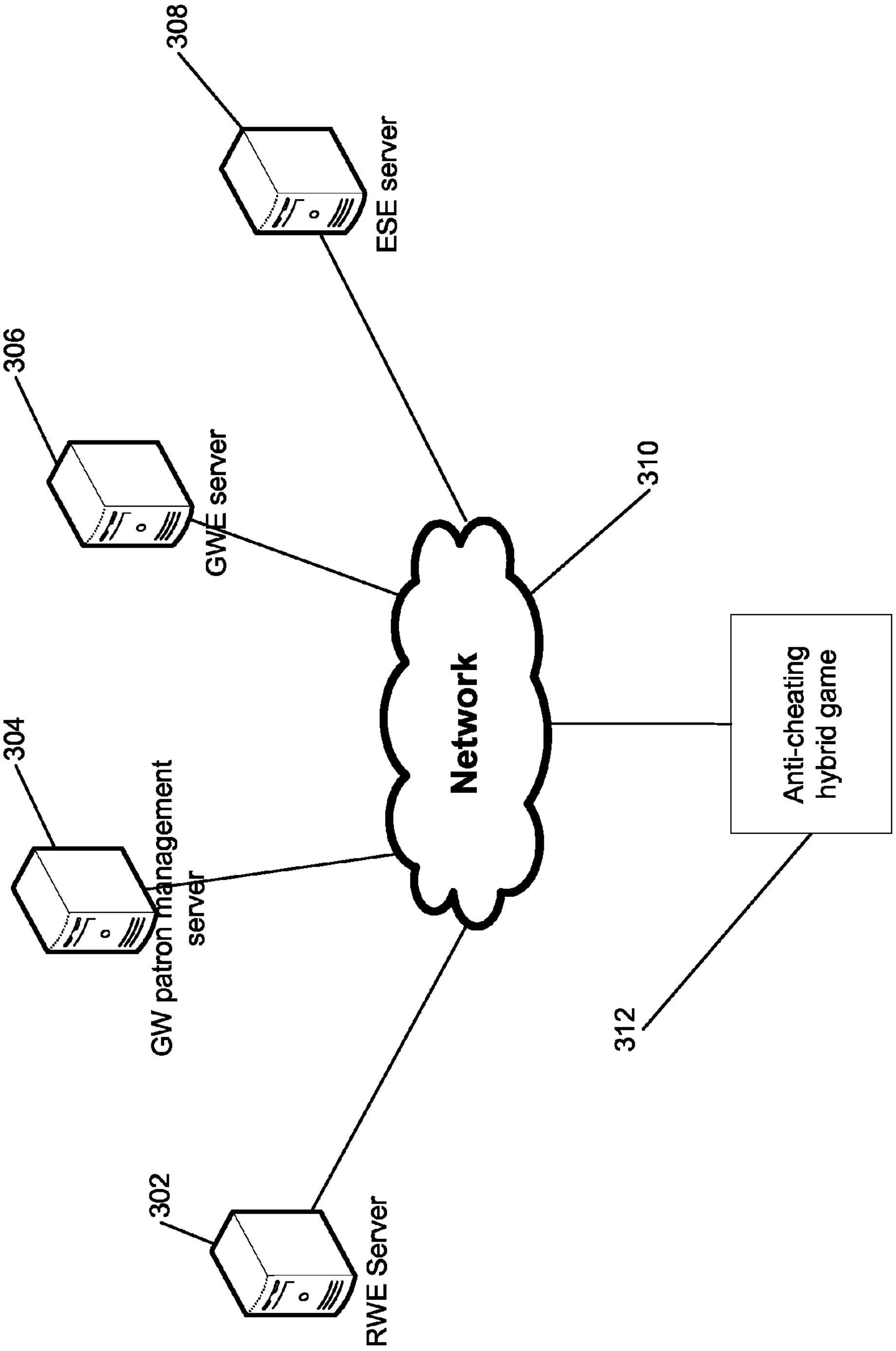
FIG. 3 is a system diagram that illustrates a network distributed anti-cheating hybrid game in accordance with an embodiment of the invention.

Anti-cheating hybrid games in accordance with many embodiments of the invention can be networked with remote servers in various configurations. A networked anti-cheating hybrid game in accordance with an embodiment of the invention is illustrated in FIG. 3. The networked anti-cheating hybrid game 312 is connected with a RWE server 302, GW patron management server 304, GWE server 306 and ESE server 308 over a network 310, such as (but not limited to) the Internet. Servers networked with a networked anti-cheating hybrid game 312 can also communicate with each of the components of a networked anti-cheating hybrid game and amongst the other servers in communication with the networked anti-cheating hybrid game 312.

Although various networked anti-cheating hybrid games are discussed above, networked anti-cheating hybrid games can be configured in any manner as appropriate to the requirements of a specific application in accordance with embodiments of the invention. Preventative measures against cheating taken by anti-cheating hybrid games are discussed further below.

Preventative Measures Against Cheating

Anti-cheating hybrid games in accordance with many embodiments of the invention implement measures to prevent and/or discourage cheating from occurring. In various embodiments, preventative measures include preventing players from easily gaining information concerning entertainment gameplay that can give the player an unfair advantage. This information can be visual information, such as in the guessing game Battleship®, published by the Milton Bradley Company headquartered in East Longmeadow, Mass. In Battleship®, game progress is dependent upon the physical layout of elements and therefore a player may attempt to cheat by knowing the layout of the opponent's player's elements. Additionally, in a shooting type of entertainment game, a player able to observe the field of play from the vantage point of more than one character at the same time can more easily track and aim at their opponents. These additional views can give the player a substantial and unfair advantage over his or her opponent in an entertainment game and constitute a cheat. Similarly, a third party may be able to communicate observations to a player to give the player an unfair advantage due to such a cheat. A number of preventative measures, such as implementation of a time delay, user interface encryption, physical separation of players and player anonymity are discussed below.

In a number of embodiments, anti-cheating hybrid games can implement a time delay for eliminated players or third parties from observing gameplay as a measure to prevent cheating in entertainment game play. In certain entertainment games that are a type of shooting game, players may have to move through an environment to find and attack their opponents. There is no time delay for those active players. At the same time, players who have been eliminated may still be able to observe gameplay around them. Conveying this information to other, still competing players can grant the players receiving this information an unfair competitive edge. Similarly, a third party observing gameplay may provide the same information to a participating player. Alternatively, a single player may enter or observe a game as two different characters, and become privy to information that gives that single player an unfair advantage. However, a measure to prevent cheating can be implemented once a player eliminated from competitive gameplay, that player's view of the gameplay can be delayed by a period of time. Therefore, when an active player enters an eliminated player's field of vision, the eliminated player cannot communicate the active player's location to another party in a timely fashion. Similarly, the gameplay view of a third party may also have a time delay so that the third party cannot reveal a player's movements to other participants.

In numerous embodiments, anti-cheating hybrid games can encrypt data used to render a user interface for a player to prevent unauthorized access to information from another player's user interface. Encryption can refer to simply changing or obfuscating the user interface of a player in a way that is difficult to decipher for other players or by encrypting the data used to render the user interface of a player. In particular embodiments, the "true" or root game map or board exists in the ESE but is not displayed directly to the player(s). Instead, gameplay screens between opponents may have a shifted map or game board. Such a shift cannot impact gameplay, but can prevent easy transfer of placement information. For example, a Battleship® game board may be rotated 90 degrees counterclockwise visually, but relative ship placement cannot be affected. The GWE, in concert with the ESE, can use a series of transformation matrices to translate entertainment game output, and player input back and forth between the root game map and the game map or maps displayed to the player(s).

In numerous embodiments, anti-cheating hybrid games avoid the placement of players in close proximity to each other as a preventative measure against cheating. In certain embodiments, information related to player's physical locations, such as but not limited to a player's IP addresses, computer hostname and/or other identifying characteristics may be tracked. An anti-cheating hybrid game can determine how many players share a similar characteristic related to the player's physical location and prevent multiple players with the same characteristic (such as IP address, computer hostname) from entering head-to-head play.

In particular embodiments, a player may compete using a home computer in a shooter type of entertainment game. If the player enters the same multi-player head-to-head play through multiple accounts, the player can be able to see the battlefield from more than one view. However, anti-cheating hybrid games in accordance with many embodiments of the invention track the IP addresses for all the players and prevent entertainment game play from more than one player at the same IP address.

In certain embodiments, anti-cheating hybrid games implement measures to physically prevent third parties from viewing the game interface of players engaging in head-to-head games. This may be implemented through a variety of measures including, but not limited to, booth-based game machines in which only one player may fit inside the game console, screens viewable only through a vision portal designed for only the player, such as a periscope, or bomb sight, heads up displays, virtual reality headsets and/or privacy screens placed on the game machine that prevent anyone not directly in front of the screen from seeing the board.

In several embodiments, the GWE of a an anti-cheating hybrid game arranges head-to-head play in such a way that the players may not be in close proximity to one another (such as but not limited to where opponents are interspersed within a block of game machines, across a casino floor, in another casino location, at home, and/or at other distributed locations). The GWE may have a roster of machines assigned to head-to-head gameplay and determine matches based on machine location. In a number of embodiments, the GWE may indicate to a player that the player must move to another location or to a specific machine to compete in head-to-head play when players are in close proximity. The GWE can also use a dynamic assignment process to set up head-to-head matches while respecting certain rules regarding the distance between machines, the time that elapses between a first head-to-head match involving specific machines (or families of machines within a certain distance from each of the machines involved) and a second head-to-head match according to a random element in machine selection. Additionally, the GWE may prevent players from starting play on specific machines if the machine is determined to be too close in proximity to other machines.

In a number of embodiments, anonymous play can be implemented as a preventative measure against cheating in an entertainment game. Anonymous play is entertainment gameplay where identifying information concerning players is obfuscated and therefore players are unable to utilize the identifying information of other players to their unfair advantage. For example, information about piece placement or movement options cannot be relayed to a specific player or concerning a specific player from a third party as the players are anonymous. In certain embodiments, this can be accomplished by not providing any information about a player, including, but not limited to obfuscating a player's skill level, user name, geographic location, or ranking. This can also be accomplished by providing false or partially false information about a player.

In particular embodiments, players may be assigned an identifying characteristic other than a name. In a number of embodiments, only a particular selection of information concerning a player may be communicated to other players, such as (but not limited to) rankings, ratings or virtual avatars. The information communicated concerning a particular player may not be unique to the player or account, and/or may change. For instance, in a game of chess, a player may know that he is competing against an "expert" level opponent, but there may be a great number of opponents with that ranking. Furthermore, that rating may change based on the opponent's performance or other non-unique characteristics. In certain embodiments, a player may not know whether the opponent is a human player or a computer.

In several embodiments, non-player interfaces may not provide information identifying the players competing. Therefore, players may know against whom they are competing, but third party observers may not know the identity of the players. In certain embodiments, players (or third parties) can learn the identity of an opponent after the conclusion of gameplay. This can allow for the development of the desirable "gamer environment" while still implementing preventative anti-cheating measures.

Although various preventative measures taken by anti-cheating hybrid games are discussed above, anti-cheating hybrid games can be configured in any manner as appropriate to the requirements of a specific application in accordance with embodiments of the invention. Measures taken to detect cheating within anti-cheating hybrid games are discussed further below.

Detection of Cheating

Anti-cheating hybrid games in accordance with embodiments of the invention can detect and penalize cheating at an entertainment game using an anti-cheating module. The anti-cheating module detects cheating and communicates with the ESE to alter the entertainment game environment and/or gameplay to impose penalties due to the detected cheating behavior. In several embodiments, an anti-cheating module runs natively within a GWE. In various embodiments, an anti-cheating module interacts with the GWE from a device external to the GWE, such as from utilizing a stand-alone anti-cheating module or a master anti-cheating server to which the relevant GWEs are in communication with. An anti-cheating server can be a stand-alone server or integrated with any of a GWE server or a GW patron management server. The anti-cheating module can utilize statistical methods to establish, to a prescribed confidence level, whether the player's performance in the game suggests that the player is cheating as performing beyond the statistical limits of the randomness inherent in an entertainment game of a hybrid game.

In various embodiments, the anti-cheating module determines if cheating has occurred by evaluating whether a given player's performance appear to be circumventing the randomness inherent in the entertainment game. For example, in Stratego®, a board game for two players distributed by Milton Bradley Inc. of East Longmeadow, Mass., a player defeating the opponent's pieces with a high degree of certainty relative to normalized expected outcomes may be a sign of cheating (such as but not limited to a detection that level 4 pieces are frequently attacking level 3 or lower or that miners are always disarming bombs). The anti-cheating module may compare the player's performance during gameplay against an appropriately large (so as to establish a high degree of statistical confidence) database of historical gameplay data from which statistics about typical play are derived. If there is a statistically meaningful difference, the player is deemed to be cheating.

In numerous embodiments, player performance can be tracked over time, across multiple gameplay sessions. In a version of the game Candyland®, a board racing game distributed by Hasbro Inc. headquartered in Pawtucket, R.I., card pull decides the entirety of gameplay. Therefore, a player of Candyland®, should not be able to win more than 50% of the player's games over time. Similarly, in games based in part on randomness, it should not be possible for a player to win a substantially higher percentage than dictated by the degree of randomness in the entertainment game. For instance, in an entertainment game such as Battleship®, skill may be a factor, but there is a measurable degree of randomness. The anti-cheating module may compare a player's historical performance against the statistics gathered about typical game win percentages. To the extent that a player's performance overwhelms the randomness inherent in the entertainment game of a hybrid game in a statistically meaningful way, the player is deemed to be cheating.

In many embodiments, measurements of the player's performance include the player's utilization of gaming resources while playing the anti-cheating hybrid game. In certain embodiments, as the player plays the entertainment game of the anti-cheating hybrid game, the player also commits RWC wagers in the gambling game portion of the anti-cheating hybrid game as triggered by the player's actions such as, but not limited to, the consumption of EE. Therefore, amounts of RWC committed and won, as well as amounts of EE consumed and returned during the play of anti-cheating hybrid game may be included in the player's performance information in order to detect cheating.

In numerous embodiments, various types or items of player performance information may be combined with each other or used in comparisons in order to generate a metric of player performance that can be used to determine if a player is cheating. In certain embodiments, ratios can be taken between amounts or rates of utilization, accrual or loss of various types of player performance information. These ratios include, but are not limited to: a rate of game world credit accrual or loss to a rate of real world credit commitment, loss or accrual; an amount of game world credit accrued or lost to an amount of real world credit committed, accrued or lost; a level or rate of entertainment game achievement to an amount or a rate of real world credit commitment, loss or accrual.

In numerous embodiments, an outlier test is used to determine if a player is cheating when the player's performance indicates that the player has significantly deviated from the statistical limits of the randomness inherent in an anti-cheating hybrid game. In certain embodiments, an outlier test such as (but not limited to) the Grubb's outlier test can be used. The Grubb's outlier test can be used to detect outliers in a data set assumed to come from a normally distributed population. These outliers can be used to indicate that player performance overwhelms the randomness inherent in an entertainment game in a statistically meaningful way. To perform the Grubb test, a value T is calculated:

$$T=Abs(Xi-X\text{mean})/s$$

where:

Abs( )=absolute value function;

Xi=observed player performance measurements for a current play session;

Xmean=mean of historical player performance measurements for previous play sessions; and s=standard deviation of Xmean.

Once T is calculated, a lookup table is used to determine the probability that a rejection of Xi as belonging to the population of Xmean is improper. For example, the lookup table illustrated in FIG. 4 can be utilized. In FIG. 4, the headings represent the probability, in percentages, that a rejection is improper, and N is the number of sampled historical data points for player performance that were used to calculate Xmean.

The table can be utilized by looking up the value of T in the table for a number N samples. Then, the probability is determined by looking up the column to the probability value featured in the header. For example, if N=20 sampled player performance measurements and T is calculated to be 2.71, then the rejection of Xi as not belonging to the population of the sampled player performance measurements has a 2.5% chance of being improper. Put another way, there is a 97.5% chance the particular instance of player performance is proper.

In several embodiments, outlier tests such as (but not limited to) Dixon's Q-test are used. In a Dixon Q-test, a ratio of distance between a tested value and its next closest value in a set of sampled values as compared to the range of all values in the sample is used to determine if the tested value comes from the same population as the set of sampled values. In certain embodiments, a process for determining a Dixon Q-test is as follows.

The sampled values of historical player performance measurements are arranged in ascending order:

$$x_1<x_2< \dots <x_N$$

A ratio, $Q_{exp}$, is calculated as the difference between the value of the currently player performance measurement, $X_N$, being tested from its nearest neighbor value, $X_{N-1}$, divided by the range of the values of player performances:

$$Q_{exp} = \frac{X_2 - X_1}{X_N - X_1}$$

$$Q_{exp} = \frac{X_N - X_{N-1}}{X_N - X_1}$$

The obtained $Q_{exp}$ value is compared to a critical Q-value ($Q_{crit}$) found in the table containing the critical Q values produced below. If $Q_{exp}>Q_{crit}$ for a particular confidence interval, then the tested player performance value can be characterized as an outlier, used to indicate that player performance overwhelms the randomness inherent in an entertainment game in a statistically meaningful way.

A table containing the critical Q values for confidence level (CL) 90%, 95% and 99% and N=3-10 is given below:

Table of critical values of Q

| N | $Q_{crit}$ (CL: 90%) | $Q_{crit}$ (CL: 95%) | $Q_{crit}$ (CL: 99%) |
|---|---|---|---|
| 3 | 0.941 | 0.970 | 0.994 |
| 4 | 0.765 | 0.829 | 0.926 |
| 5 | 0.642 | 0.710 | 0.821 |
| 6 | 0.560 | 0.625 | 0.740 |
| 7 | 0.507 | 0.568 | 0.680 |
| 8 | 0.468 | 0.526 | 0.634 |
| 9 | 0.437 | 0.493 | 0.598 |
| 10 | 0.412 | 0.466 | 0.568 |

Although various methods for detecting cheating in an anti-cheating hybrid game are discussed above, anti-cheating hybrid games can be configured in any manner as appropriate to the requirements of a specific application in accordance with embodiments of the invention. Measures taken to penalize cheating within anti-cheating hybrid games are discussed further below.

Penalizing Cheating

Anti-cheating hybrid games in accordance with many embodiments of the invention can penalize cheating utilizing an anti-cheating module that configures a GWE. The penalties for cheating can be customized to the type of cheating detected. In several embodiments, a penalty assessment methodology can be utilized by an anti-cheating module to establish a series of penalty thresholds. For each threshold, a specific punitive action is prescribed. In various embodiments, penalties assessed due to cheating can be outside the entertainment game (such as but not limited to suspension of a player's account, disgorgement of winnings), or inside the entertainment game (such as but not limited to where a player's character is severely injured by stepping on a land mine, the player's gun jams, the player's football team is assessed a penalty and loss of down in a football game).

In various embodiments, penalty thresholds are reached as a function of the player having been found to be cheating a certain number of times. For example, a counter can be maintained in the player's profile as to the number of times that cheating is detected, such as (but not limited to) when the player's performance exceeds the statistical limits of the randomness inherent in the entertainment game. The counter can be used to track one or more measures of cheating frequency with a single counter (such as but not limited to where each game in which a player cheats across multiple game titles can be tracked singularly), or multiple counters can be used in parallel across different games or to measure cheating along multiple dimensions within a single game, each triggering thresholds independently. For example, when the counter reaches a certain level (A), a warning may be issued to the player. The counter may reflect (but it not limited to only reflecting) the number of individual game sessions in which cheating was identified, or the number of specific intervals (such as but not limited to the time or levels) of gameplay in which cheating was identified, or the number of times cheating occurred and a bet over a certain amount was won, or a combination of these factors. When the counter reaches a second threshold (equal to or greater to the level A), (B), the player may have the player's account flagged for manual review and a higher level of go-forward scrutiny. At a third threshold (C), the player's account may be temporarily suspended, and at a fourth threshold (D) the account may be permanently closed and the individual behind the account precluded from participating in subsequent activities within the entertainment game in question. The thresholds A through D may be coincident or reflect a step-wise (but not necessarily linear) increase in the counter, and a variety of different punitive actions may be implemented. Further examples of punitive measures against cheating can accompany crossing one or more of the thresholds A through D, including (but are not limited to) the withholding of winnings, reduction of winnings, or the assessment of penalties or fines (against a deposit that can, for example, be required by players to participate in the skill based wagering aspect of hybrid game play). A threshold counter can be maintained until a resetting event takes place, such as a certain number of gameplay sessions or a certain amount of elapsed time without any increase in the counter. Although four levels of punitive action are discussed above, any number of levels of punitive action can be utilized by an anti-cheating hybrid game as appropriate to the requirements of a specific application in accordance with embodiments of the invention.

In various embodiments utilizing a game of Battleship®, cheating can occur where a player illicitly sees the placement of his opponent's pieces. An anti-cheating module can compare the accuracy of the player's bomb placement over a period of twenty moves against the statistical expectations of the randomness inbuilt in the entertainment game. When there is a high statistical confidence that the player is cheating, a counter increases from 0 to 1 and a warning is issued to the player and gameplay continues. In certain embodiments, additional periods of time are evaluated, such as two more samples of twenty moves, and when the determination is made that the player is still performing beyond the limits of random influence, threshold B is crossed, causing the player's account to be flagged for review, and a second warning is issued.

Figure 5:
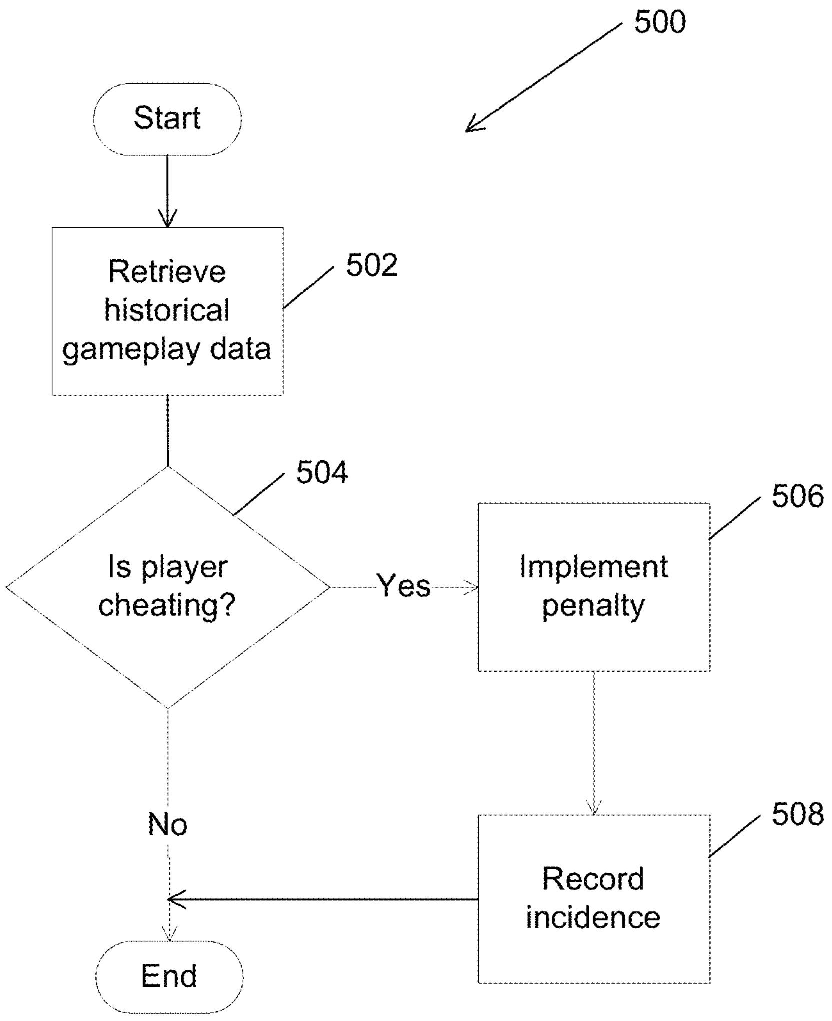
FIG. 5 is a flow chart of a process for penalizing cheating in accordance with an embodiment of the invention.

A process for imposing a penalty for cheating in accordance with an embodiment of the invention is illustrated in FIG. 5. The process 500 includes retrieving (502) historical gameplay data. This historical gameplay data can be the historical gameplay of the player, of the players of a particular entertainment game or of players of entertainment games generally. A determination (504) is made as to whether the player is cheating. This determination (504) can be based upon any criteria, including but not limited to whether the player's performance in the entertainment game suggests that the player is performing beyond the statistical limits of the randomness inherent in the entertainment game. Additionally, this determination (504) can be made continually as player gameplay is monitored. If the player is determined to be cheating, then a penalty is implemented (506), the cheating incident is recorded (508) and the process ends. If the player is not determined to be cheating, then the process ends.

Although various methods for penalizing cheating in an anti-cheating hybrid game are discussed above, anti-cheating hybrid games can be configured in any manner as appropriate to the requirements of a specific application in accordance with embodiments of the invention. Processing apparatuses capable of implementing anti-cheating hybrid games are discussed further below.

Processing Apparatus

Figure 6:
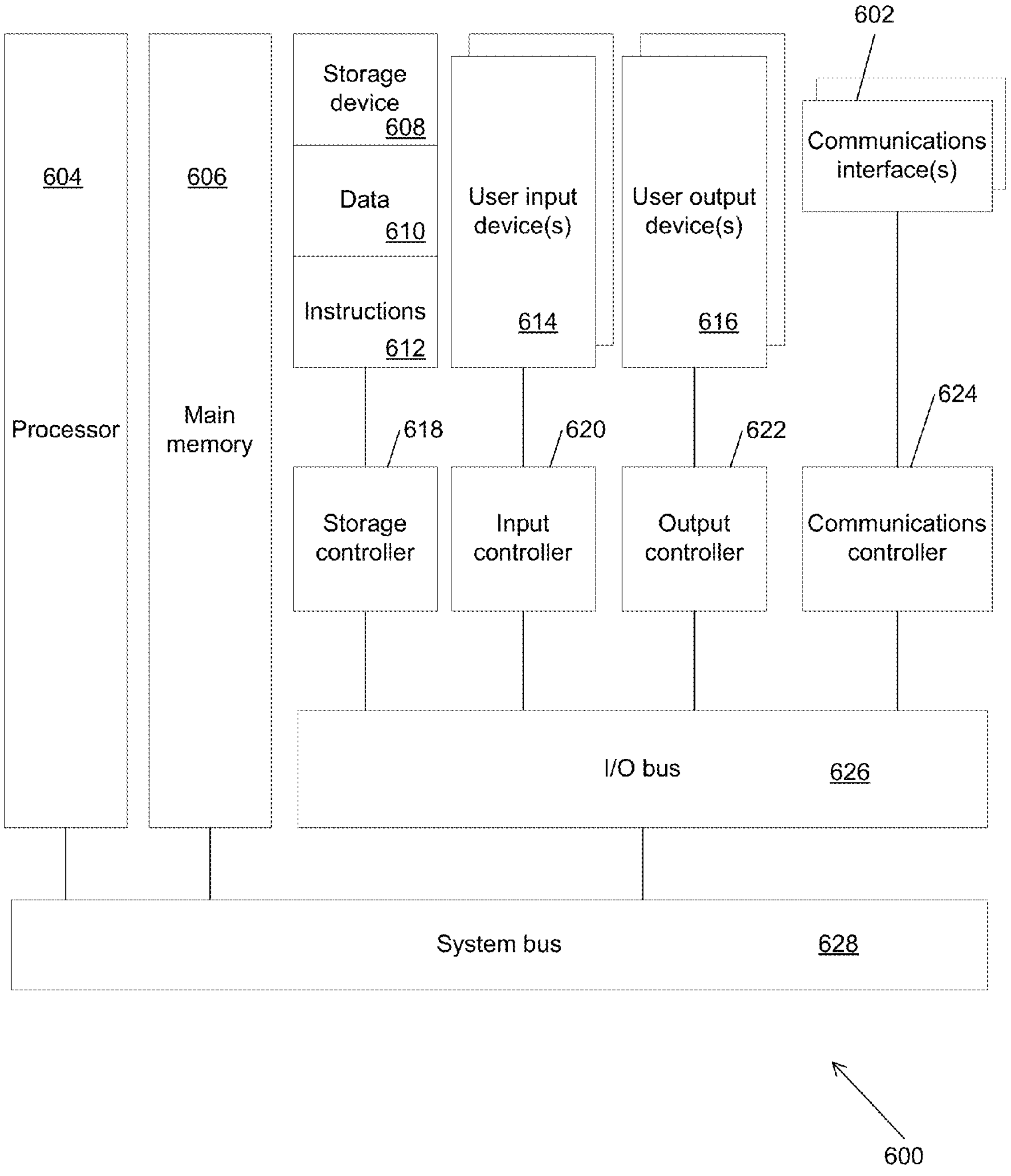
FIG. 6 illustrates a hardware architecture diagram of a processing apparatus in accordance with an embodiment of the invention.

Any of a variety of processing apparatuses can host various components of an anti-cheating hybrid game in accordance with embodiments of the invention. In several embodiments, these processing apparatuses can include, but are not limited to, a gaming machine, a general purpose computer, a computing device and/or a controller. A processing apparatus that is constructed to implement an anti-cheating hybrid game in accordance with an embodiment of the invention is illustrated in FIG. 6. In the processing apparatus 600, a processor 604 is coupled to a memory 606 by a bus 628. The processor 604 is also coupled to non-transitory processor-readable storage media, such as a storage device 608 that stores processor-executable instructions 612 and data 610 through the system bus 628 to an I/O bus 626 through a storage controller 618. The processor 604 is also coupled to one or more interfaces that may be used to connect the processor to other processing apparatuses as well as networks as described herein. The processor 604 is also coupled via the bus to user input devices 614, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 604 is connected to these user input devices 614 through the system bus 628, to the I/O bus 626 and through the input controller 620. The processor 604 is also coupled via the bus to user output devices 616 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 628 to the I/O bus 626 and through the output controller 622. The processor 604 can also be connected to a communications interface 602 from the system bus 628 to the I/O bus 626 through a communications controller 624.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or may be implemented on a single processing apparatus. In addition, while certain aspects and features of element management processes described herein have been attributed to an RWE, GWE, or ESE, these aspects and features may be implemented in a hybrid form where any of the features or aspects may be performed by any of a RWE, GWE, ESE within an anti-cheating hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An anti-cheating hybrid game, comprising:

a gambling game comprising a real world engine constructed to provide a randomly generated payout of real world credits for a wager of an amount of real world credits in the gambling game;

an entertainment software engine constructed to execute an entertainment game providing outcomes upon a player's skillful execution of the entertainment game to earn an amount of game world credits;

a game world engine constructed to manage the entertainment software engine and communicate gameplay gambling event occurrences based upon the player's skillful execution of the entertainment game that trigger the wager of the amount of real world credits and the randomly generated payout for the gambling game to the gambling game; and wherein the game world engine incorporates an anti-cheating module and the anti-cheating module is constructed to:

receive player performance information for the player, where the player performance information is indicative of the player's current gameplay performance at the hybrid game and includes the amount of game world credit accrued in the entertainment game of the hybrid game and the amount of real world credit committed as wagers in the gambling game of the hybrid game;

analyze the player performance information to determine whether cheating is occurring by comparing the player's current gameplay performance as determined by a ratio of the amount of accrued game world credit to the amount of committed real world credit with historical gameplay data,. to evaluate whether the player's current gameplay performance is beyond a statistical limit of randomness inherent in the hybrid game using an outlier test; and send a command to penalize the player during play of the hybrid game based upon a determination that cheating has occurred from the analyzed player performance information.

2. The anti-cheating hybrid game of claim 1, wherein the player performance information is gameplay data concerning the player's historical performance at the hybrid game over several gameplay sessions.

3. The anti-cheating hybrid game of claim 1, wherein the historical gameplay performance information is gameplay data concerning historical performance of players at the hybrid game over several gameplay sessions.

4. The anti-cheating hybrid game of claim 1, wherein the outlier test is a Grubb's outlier test.

5. The anti-cheating hybrid game of claim 1, wherein the command to penalize the player is a command to suspend a player account of the player determined to be cheating.

6. The anti-cheating hybrid game of claim 1, wherein the command to penalize at least one player is determined based upon a value of at least one counter that is incremented upon each instance of cheating.

7. The anti-cheating hybrid game of claim 1, wherein the anti-cheating module is constructed to communicate with the game world engine via a network.

8. The anti-cheating hybrid game of claim 1, wherein the outlier test is a Dixon Q-Test outlier test.

9. A method of operating an anti-cheating hybrid game comprising:

executing an entertainment game of the hybrid game, the entertainment game providing outcomes upon a player's skillful execution of the entertainment game to earn an amount of game world credits generating gameplay gambling event occurrences based upon the player's skillful execution of the entertainment game to trigger a wager of an amount of real world credits and a randomly generated payout for a gambling game of the hybrid game;

providing the randomly generated payout of real world credits for the wager of the amount of real world credits in the gambling game of the hybrid game;

receiving player performance information for the player, where the player performance information is indicative of the player's current gameplay performance at the hybrid game and includes the amount of game world credit accrued in the entertainment game of the hybrid game and the amount of real world credit committed as wagers in the gambling game of the hybrid game;

analyzing the player performance information to determine whether cheating is occurring by comparing the player's current gameplay performance as determined by a ratio of the amount of accrued game world credit to the amount of committed real world credit with historical gameplay data, to evaluate whether the player's current gameplay performance is beyond a statistical limit of randomness inherent in the hybrid game using an outlier test; and sending a command to penalize at least one player during play of the hybrid game based upon a determination that cheating has occurred from the analyzed player performance information.

10. The method of claim 9, wherein the player performance information is gameplay data concerning at least one player's historical performance at the entertainment game over several gameplay sessions.

11. The method of claim 9, wherein the player performance information is gameplay data concerning historical performance of players at the entertainment game over several gameplay sessions.

12. The method of claim 9, wherein penalizing the player includes suspending a player account of the player determined to be cheating.

13. The method of claim 9, wherein the command to penalize the at least one player is determined based upon a value of at least one counter that is incremented upon each instance of cheating.

14. The anti-cheating hybrid game of claim 9, wherein an anti-cheating module is utilized for analyzing the player performance information and penalizing the player, and wherein the anti-cheating module is constructed to communicate with the anti-cheating hybrid game via a network.

15. The method of claim 9, wherein the outlier test is a Grubb's outlier test.

16. The method of claim 9, wherein the outlier test is a Dixon Q-Test outlier test.

17. A non-transitory machine readable medium storing processor instructions, where execution of the instructions by a processor causes the processor to perform a process of an anti-cheating hybrid game, the process comprising:

executing an entertainment game of the hybrid game, the entertainment game providing outcomes upon a player's skillful execution of the entertainment game to earn an amount of game world credits generating gameplay gambling event occurrences based upon the player's skillful execution of the entertainment game to trigger a wager of an amount of real world credits and a randomly generated payout for a gambling game of the hybrid game;

providing the randomly generated payout of real world credits for the wager of the amount of real world credits in the gambling game of the hybrid game;

receiving player performance information for the player, where the player performance information is indicative of the player's current gameplay performance at the hybrid game and includes the amount of game world credit accrued in the entertainment game of the hybrid game and the amount of real world credit committed as wagers in the gambling game of the hybrid game;

analyzing the player performance information to determine whether cheating is occurring by comparing the player's current gameplay performance as determined by a ratio of the amount of accrued game world credit to the amount of committed real world credit with historical gameplay data to evaluate whether the player's current gameplay performance is beyond a statistical limit of randomness inherent in the hybrid game using an outlier test; and penalizing the player during play of the hybrid game based upon a determination that cheating has occurred from the analyzed player performance information.

18. The non-transitory machine readable medium of claim 17, wherein the outlier test is a Grubb's outlier test.

19. The non-transitory machine readable medium of claim 17, wherein the outlier test is a Dixon Q-Test outlier test.

* * * * *